(12) United States Patent
Fouda et al.

(10) Patent No.: US 11,885,924 B2
(45) Date of Patent: Jan. 30, 2024

(54) LOCATING COLLARS ON WELL CASINGS

(71) Applicant: Halliburton Energy Services, Inc., Houston, TX (US)

(72) Inventors: Ahmed Fouda, Houston, TX (US); Sadeed Sayed, Singapore (SG); Radompon Sungkorn, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/550,205

(22) Filed: Dec. 14, 2021

(65) Prior Publication Data

US 2023/0184984 A1 Jun. 15, 2023

(51) Int. Cl.
*G01V 3/10* (2006.01)
*E21B 47/085* (2012.01)

(52) U.S. Cl.
CPC .............. *G01V 3/10* (2013.01); *E21B 47/085* (2020.05); *E21B 2200/20* (2020.05)

(58) Field of Classification Search
None
See application file for complete search history.

(56) References Cited

U.S. PATENT DOCUMENTS

| | | | |
|---|---|---|---|
| 5,748,471 A | 5/1998 | Grande | |
| 6,896,056 B2 | 5/2005 | Mendez et al. | |
| 9,983,173 B2 | 5/2018 | Aslanyan et al. | |
| 10,920,578 B2 | 2/2021 | San Martin et al. | |
| 10,954,778 B2 | 3/2021 | San Martin et al. | |
| 11,125,076 B1 * | 9/2021 | Zeghlache | ............... G01V 3/30 |
| 2016/0266271 A1 | 9/2016 | Fouda et al. | |
| 2018/0172872 A1 | 6/2018 | Fouda et al. | |
| 2018/0230796 A1 * | 8/2018 | Donderici | ............... E21B 47/09 |

(Continued)

FOREIGN PATENT DOCUMENTS

CA 2770230 A1 * 2/2011 ............. E21B 44/00

OTHER PUBLICATIONS

Schlumberger, EM Pipe Scanner Brochure, 2009, accessed Dec. 17, 2021.

(Continued)

*Primary Examiner* — Patrick Assouad
*Assistant Examiner* — Haidong Zhang
(74) *Attorney, Agent, or Firm* — John W. Wustenberg; Tumey Law Group, PLLC

(57) ABSTRACT

A method and system may include disposing an electromagnetic (EM) logging tool in a wellbore. The EM logging tool may include a transmitter disposed on the EM logging tool and a receiver disposed on the EM logging tool. The method may further include transmitting an electromagnetic field from the transmitter into one or more, measuring the eddy current in the one or more tubulars with the receiver, and forming an EM log from the plurality of measurements. Additionally, the method may include identifying a representative signature of a collar from the EM log, locating a plurality of signatures that are similar to the representative signature, iteratively locating a collar signature based at least in part on the representative signature, the plurality of signatures that are similar to the representative signature, and a joint length; and displaying a depth for each of the one or more collars.

21 Claims, 11 Drawing Sheets

(56) References Cited

U.S. PATENT DOCUMENTS

| | | |
|---|---|---|
| 2019/0078430 A1* | 3/2019 | Fouda ................. E21B 47/0025 |
| 2020/0103374 A1 | 4/2020 | Guner et al. |
| 2020/0182830 A1 | 6/2020 | Fouda et al. |
| 2020/0190969 A1 | 6/2020 | Ren et al. |
| 2020/0200940 A1 | 6/2020 | Fouda et al. |
| 2020/0271818 A1 | 8/2020 | Fouda et al. |
| 2020/0284141 A1 | 9/2020 | San Martin et al. |
| 2020/0309986 A1 | 10/2020 | Donderici et al. |
| 2020/0319362 A1 | 10/2020 | Guner et al. |
| 2020/0333500 A1* | 10/2020 | Fouda ................... E21B 47/006 |
| 2020/0378240 A1 | 12/2020 | Fouda et al. |
| 2021/0054731 A1 | 2/2021 | Fouda et al. |
| 2021/0189858 A1 | 6/2021 | Donderici et al. |
| 2021/0239874 A1 | 8/2021 | Fouda |
| 2021/0270127 A1 | 9/2021 | Zhu et al. |

OTHER PUBLICATIONS

Gowell, Enhanced Pipe Detection Tool (ePDT), 2017, accessed Dec. 17, 2021.
Electromagnetic Pipe Xaminer® V (Epx™ V) Tool, 2019, accessed Dec. 17, 2021.
Schlumberger, EM Pipe Scanner Brochure, 2009.
Gowell, Enhanced Pipe Detection Tool (ePDT), 2017.
International Search Report and Written Opinion for Application No. PCT/US2021/064699, dated Aug. 29, 2022.

* cited by examiner

LOCATING COLLARS ON WELL CASINGS

BACKGROUND

For oil and gas exploration and production, a network of wells, installations and other conduits may be established by connecting sections of metal pipe together. For example, a well installation may be completed, in part, by lowering multiple sections of metal pipe (e.g., a casing string) into a wellbore, and cementing the casing string in place. In some well installations, multiple casing strings are employed (e.g., a concentric multi-string arrangement) to allow for different operations related to well completion, production, or enhanced oil recovery (EOR) options Electromagnetic (EM) techniques are commonly used to monitor the condition of the pipes in oil/gas wellbore including various kinds of casing strings and tubing. One common EM technique utilizes eddy current (EC). In EC, when the transmitter coil emits the primary transient EM fields, eddy currents are induced in the casing. These eddy currents then produce secondary fields which are received along with the primary fields by the receiver coil. The acquired data my then be employed to perform evaluation of the multiple pipes.

Locating collars on multiple pipe strings from electromagnetic log data is a challenging problem. Pipe joint lengths may vary within a range of several feet and oftentimes short joints (pup joints) are intentionally used as depth markers. Relying solely on periodicity for locating collars is not a feasible approach. On the other hand, the signature of a collar on a given pipe may vary significantly depending on the degree of overlap of that collar with collars on other pipes. This makes identifying collars based on pattern recognition an unreliable approach. Existing collar locator algorithms rely on one or both of the above techniques. However, ambiguous situations may arise where none of the above techniques is sufficient to resolve the ambiguity, or contradicting indications are suggested by using different criteria. A fully automated collar locator could make a wrong decision in these situations (e.g., assigning collars to the wrong pipes) and errors start accumulating from that point onwards. After the algorithm returns, an analyst may have to inspect algorithm picks and correct errors by deleting a long stack of collars from multiple pipes and picking them from scratch from the raw data. This is a tedious process that is time consuming, prone to human error, and expensive.

BRIEF DESCRIPTION OF THE DRAWINGS

These drawings illustrate certain aspects of some examples of the present disclosure and should not be used to limit or define the disclosure.

DETAILED DESCRIPTION

This disclosure may generally relate to pipe inspection in subterranean wells and, more particularly, to methods and systems for identifying and locating collars on a well-casings with multiple nested pipes using an electromagnetic inspection tool. Identifying and locating collars may be performed by with systems and methods utilizing an interactive workflow in which an automatic algorithm is combined with a user-assisted methodology for resolving ambiguities. The automatic algorithm receives EM measurements, which are used to predictively locate collars in which a user reviews and confirms.

Electromagnetic (EM) sensing may provide continuous in-situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches to about seven inches or more).

EM logging tools may measure eddy currents to determine metal loss, location of collars, and use magnetic cores with one or more coils to detect defects in multiple concentric pipes. The EM logging tools may use pulse eddy current (time-domain) and may employ multiple (long, short, and transversal) coils to evaluate multiple types of defects in multiple concentric pipes. It should be noted that the techniques utilized in time-domain may be utilized in frequency-domain measurements. In examples, EM logging tools may operate on a conveyance. Additionally, EM logging tools may include an independent power supply and may store the acquired data on memory.

Monitoring the condition of the production and intermediate casing strings is crucial in oil and gas field operations. EM eddy current (EC) techniques have been successfully used in inspection of these components. EM EC techniques include two broad categories: frequency-domain EC techniques and time-domain EC techniques. In both techniques, one or more transmitters are excited with an excitation signal, and the signals from the pipes are received and recorded for interpretation. The magnitude of a received signal is typically inversely proportional to the amount of metal that is present in the inspection location. For example, less signal magnitude is typically an indication of more metal, and more signal magnitude is an indication of less metal or more metal. This relationship may allow for measurements of metal loss, which typically is due to an anomaly related to the pipe such as corrosion or buckling. Metal gain may indicate the presence of a collar.

Figure 1:
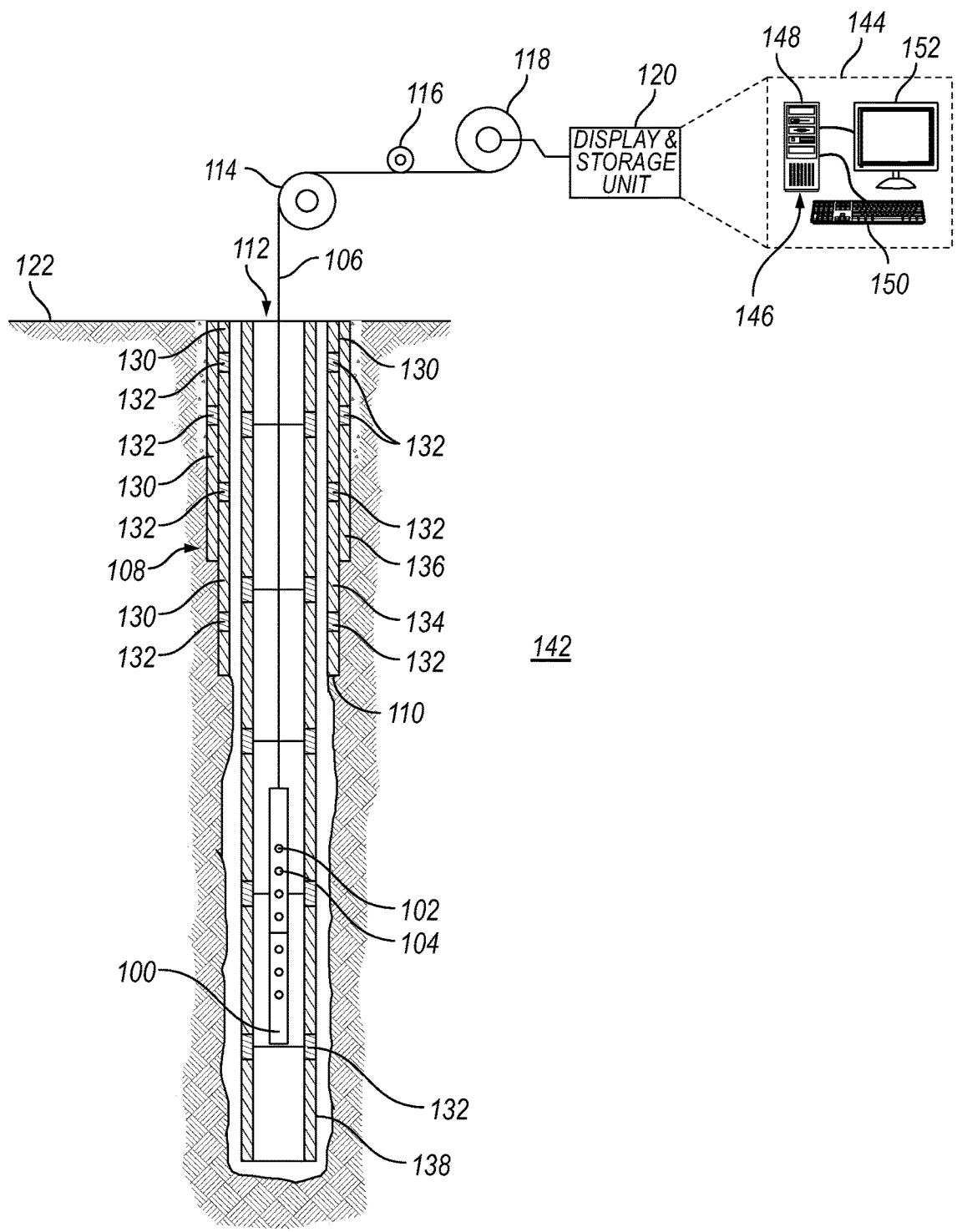
FIG. 1 illustrates an example of an EM logging tool disposed in a wellbore.

FIG. 1 illustrates an operating environment for an EM logging tool 100 as disclosed herein in accordance with some embodiments. EM logging tool 100 may comprise a transmitter 102 and/or a receiver 104. In examples, transmitters 102 and receivers 104 may be coil antennas. Furthermore, transmitter 102 and receiver 104 may be separated by a space between about 0.1 inches (0.254 cm) to about 200 inches (508 cm). In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104 or vice versa. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in wellbore 110.

Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. It should be noted that an operator may include an individual, group of individuals, or organization, such as a service company. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100 in casing string 108.

A typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. Such as, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

EM logging tool 100 may include a digital telemetry system which may further include one or more electrical circuits, not illustrated, to supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within EM logging tool 100 and data provided by EM logging tool 100 may be stored within EM logging tool 100, rather than transmitted to the surface to display and storage unit 120 during logging operations. The data may include signals and measurements related to corrosion detection.

During operations, transmitter 102 may broadcast electromagnetic fields into subterranean formation 142. It should be noted that broadcasting electromagnetic fields may also be referred to as transmitting electromagnetic fields. The electromagnetic fields transmitted from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed and/or measured by receivers 104. Characterization of casing string 108 and pipe string 138, including determination of pipe attributes, may be performed by measuring and processing primary and secondary electromagnetic fields. Pipe attributes may include, but are not limited to, pipe thickness, pipe conductivity, and/or pipe permeability.

As illustrated, receivers 104 may be positioned on EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Broadcasting of EM fields by transmitter 102 and the sensing and/or measuring of secondary electromagnetic fields by receivers 104 may be controlled by display and storage unit 120, which may include an information handling system 144. As illustrated, the information handling system 144 may be a component of or be referred to as the display and storage unit 120, or vice-versa. Alternatively, the information handling system 144 may be a component of EM logging tool 100. An information handling system 144 may include any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price.

Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed and/or measured with the primary electromagnetic fields by receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be sensed and/or measured by receivers 104 placed at some distance on EM logging tool 100 from transmitter 102, as shown on FIG. 1. Alternatively, the secondary electromagnetic fields may be sensed and/or measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times for first casing 134, for second casing 136, and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. In examples, a remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}} t \qquad (1)$$

and the magnitude of the impedance shows the dependence:

$$\exp\left[-2\left(\sqrt{\frac{\omega\mu\sigma}{2}}\right)t\right] \qquad (2)$$

where ω is the angular frequency of the excitation source, μ is the magnetic permeability of the pipe, σ is the electrical conductivity of the pipe, and t is the thickness of the pipe. By using the common definition of skin depth for the metals as:

$$\delta = \sqrt{\frac{2}{\omega\mu\sigma}} \qquad (3)$$

The phase of the impedance varies as:

$$\varphi \cong 2\frac{t}{\delta} \qquad (4)$$

and the magnitude of the impedance shows the dependence:

$$\exp\left[\frac{-2t}{\delta}\right] \quad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal which broadcast an electromagnetic field and receiver 104 may sense and/or measure the reflected excitation signal, a secondary electromagnetic field, for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
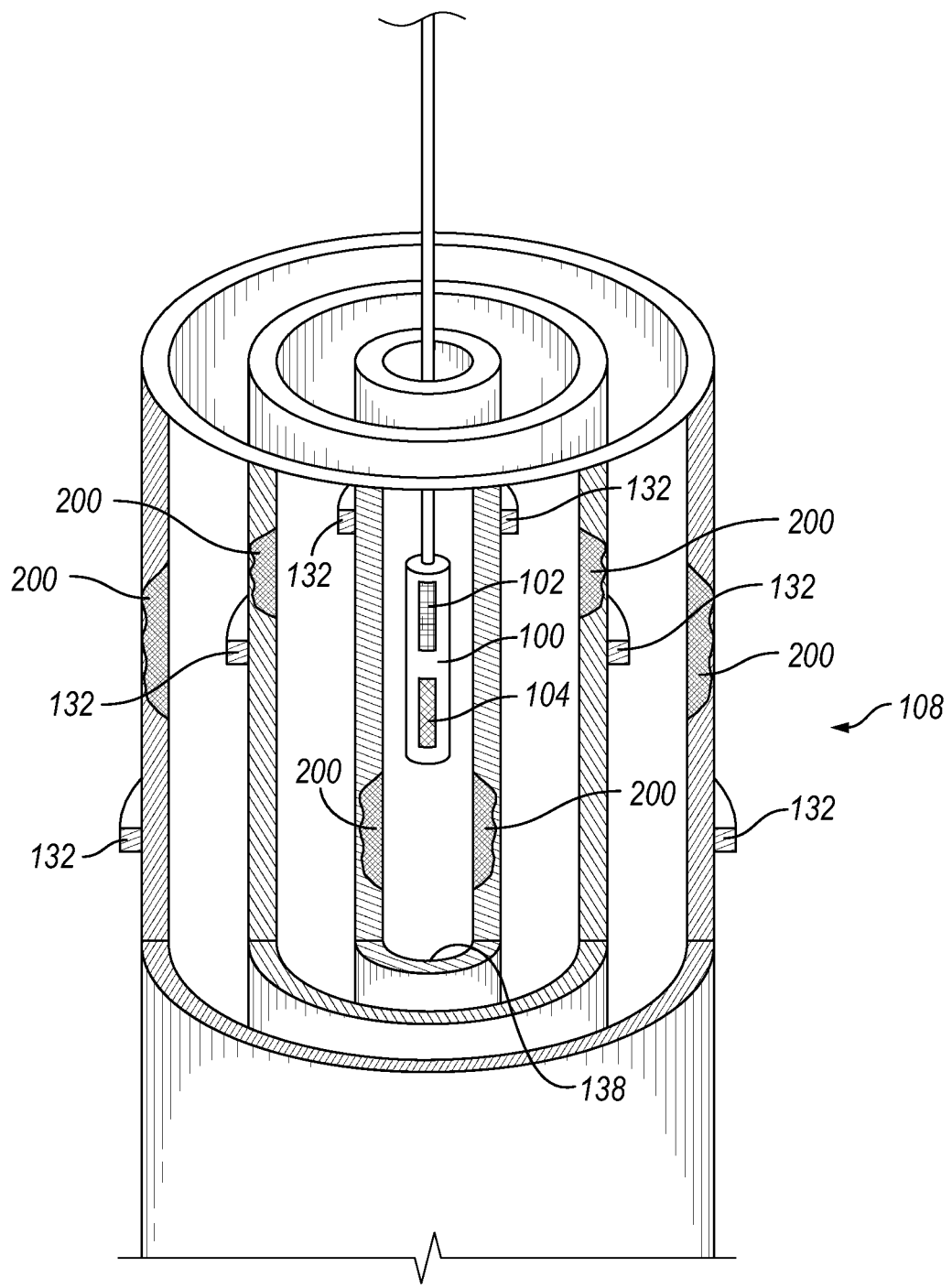
FIG. 2 illustrates an example of arbitrary defects within multiple pipes.
Figure 3A:
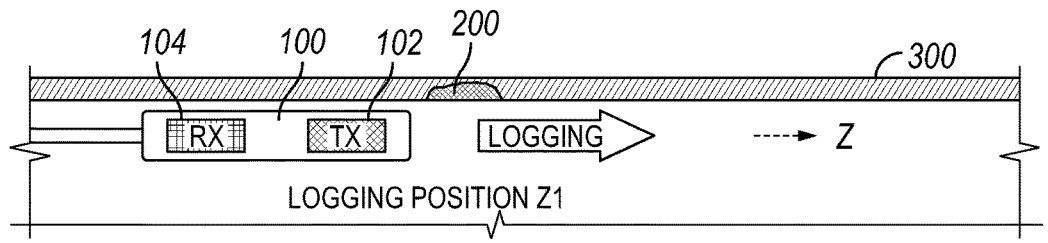
FIG. 3A illustrates an example of an EM logging tool traversing a wellbore.
Figure 3B:
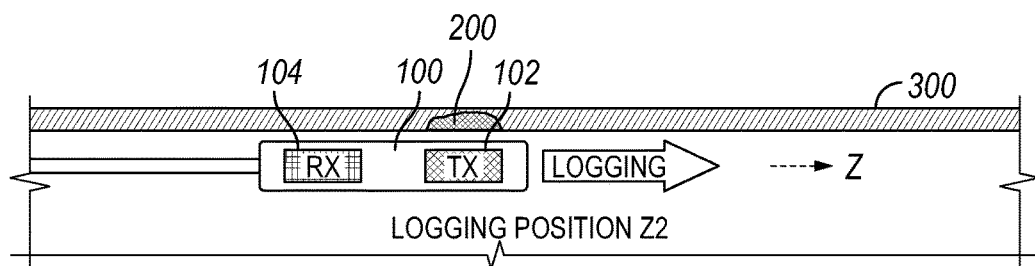
FIG. 3B illustrates another example of an EM logging tool traversing a wellbore.
Figure 3C:
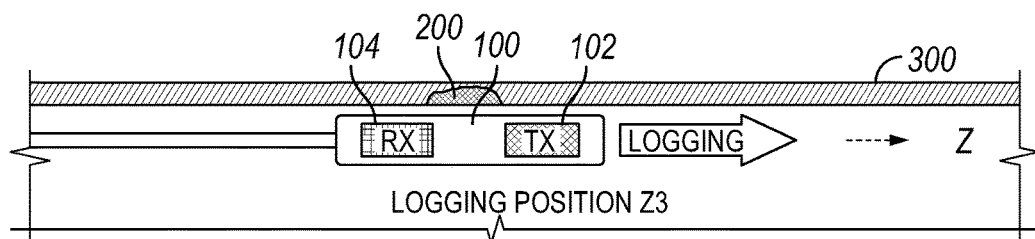
FIG. 3C illustrates another example of an EM logging tool traversing a wellbore.
Figure 3D:
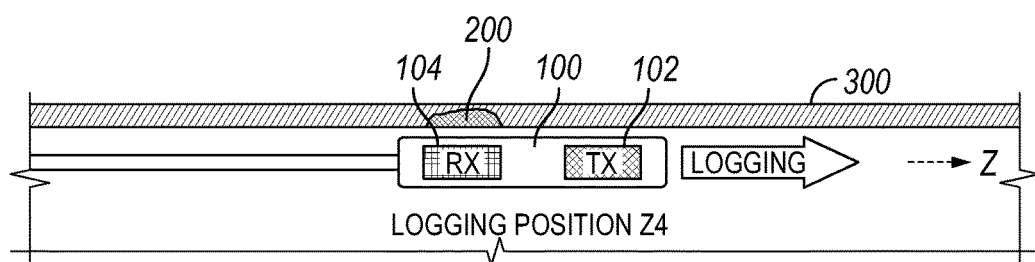
FIG. 3D illustrates another example of an EM logging tool traversing a wellbore.
Figure 3E:
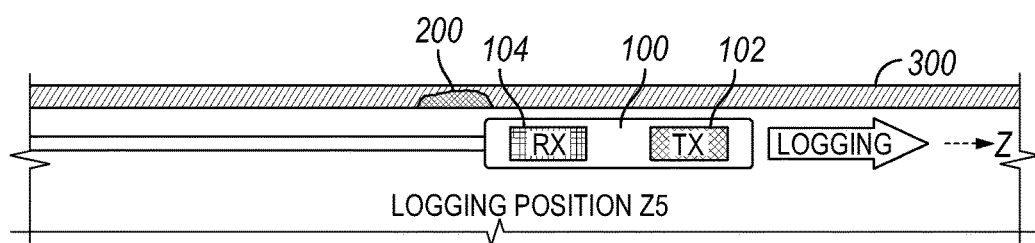
FIG. 3E illustrates another example of an EM logging tool traversing a wellbore.

FIG. 2 shows EM logging tool 100 disposed in pipe string 138 which may be surrounded by a plurality of nested pipes (e.g., first casing 134 and second casing 136) and an illustration of anomalies 200 disposed within the plurality of nested pipes, in accordance with some embodiments. As EM logging tool 100 moves across pipe string 138 and casing string 108, one or more transmitters 102 may be excited, and a signal (mutual impedance between 102 transmitter and receiver 104) at one or more receivers 104, may be recorded.

Due to eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing, and frequencies may be utilized. For example, short spaced transmitters 102 and receivers 104 may be sensitive to first casing 134, while longer spaced transmitters 102 and receivers 104 may be sensitive to second casing 136 and/or deeper (3rd, 4th, etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. It should be noted that inversion methods may include model-based inversion which may include forward modeling. However, there may be factors that complicate interpretation of losses. For example, deep pipe signals may be significantly lower than other signals. Double dip indications appear for long spaced transmitters 102 and receivers 104. Spatial spread of long spaced transmitter-receiver signals for a collar 132 may be long (up to 6 feet (1.8 meters)). Due to these complications, methods may need to be used to accurately inspect pipe features.

FIGS. 3A-3E illustrates an electromagnetic inspection and detection of anomalies 200 (e.g., defects) or collars 132 (e.g., Referring to FIG. 2), in accordance with some embodiments. As illustrated, EM logging tool 100 may be disposed in pipe string 138, by a conveyance, which may comprise any number of concentric pipes. As EM logging tool 100 traverses across pipe 300, one or more transmitters 102 may be excited, and a signal (mutual impedance between transmitter 102 and receiver 104) at one or more receivers 104, may be recorded. Due to eddy currents and electromagnetic attenuation, pipe 300 may generate an electrical signal that is in the opposite polarity to the incident signal and results in a reduction in a received signal. Thus, more metal volume translates to greater signal lost. As a result, by inspecting the signal gains, it may be possible to identify zones with metal loss (such as corrosion). Similarly, by inspecting the signal loss, it may be possible to identify metal gain such as due to presence of a casing collar 132 (e.g., Referring to FIG. 1) where two pipes meet with a threaded connection. In order to distinguish signals from different pipes in a multiple concentric pipe configuration, multiple transmitter-receiver spacing, and frequencies may be used. For example, short spaced transmitters 102 and receivers 104 may be sensitive to pipe string 138, while long spaced transmitters 102 and receivers 104 may be sensitive to deeper pipes (e.g., first casing 124, second casing 136, etc.). By analyzing the signal levels at these different channels through a process of inversion, it may be possible to relate a certain received signal set to a certain set of metal loss or gain at each pipe. In examples, there may be factors that complicate the interpretation and/or identification of collars 132 and/or anomalies 200 (e.g., defects).

For example, due to eddy current physics and electromagnetic attenuation, pipes disposed in pipe string 138 (e.g., referring to FIG. 1 and FIG. 2) may generate an electrical signal that may be in the opposite polarity to the incident signal and results in a reduction in the received signal. Generally, as metal volume increases the signal loss may increase. As a result, by inspecting the signal gains, it may be possible to identify zones with metal loss (such as corrosion). In order to distinguish signals that originate from anomalies 200 (e.g., defects) at different pipes of a multiple nested pipe configuration, multiple transmitter-receiver spacing, and frequencies may be used. For example, short spaced transmitters 102 and receivers 104 may be sensitive to first pipe string 138 (e.g., referring to FIG. 2), while long spaced transmitters 102 and receivers 104 may be sensitive to deeper ($2^{nd}$, $3^{rd}$, etc.) pipes (e.g., first casing 134 and second casing 136).

Analyzing the signal levels at different channels with an inversion scheme, it may be possible to relate a certain received signal to a certain metal loss or gain at each pipe. In addition to loss of metal, other pipe properties such as magnetic permeability and electrical conductivity may also be estimated by inversion. There may be several factors that complicate interpretation of losses: (1) deep pipe signals may be significantly lower than other signals; (2) double dip indications appear for long spaced transmitters 102 and receivers 104; (3) spatial spread of long spaced transmitter-receiver signal for a collar 132 may be long (up to 6 feet); (4) to accurately estimate of individual pipe thickness, the material properties of the pipes (such as magnetic permeability and electrical conductivity) may need to be known with fair accuracy; (5) inversion may be a non-unique process, which means that multiple solutions to the same problem may be obtained and a solution which may be most physically reasonable may be chosen. Due to these complications, an advanced algorithm or workflow may be used to accurately inspect pipe features, for example when more than two pipes may be present in pipe string 138.

During logging operations as EM logging tool 100 traverses across pipe 300 (e.g., referring to FIG. 3), an EM log of the received signals may be produced and analyzed. The EM log may be calibrated prior to running inversion to account for the deviations between measurement and simulation (forward model). The deviations may arise from several factors, including the nonlinear behavior of the magnetic core, magnetization of pipes, mandrel effect, and inaccurate well plans. Multiplicative coefficients and constant factors may be applied, either together or individually, to the measured EM log for this calibration.

Figure 4:
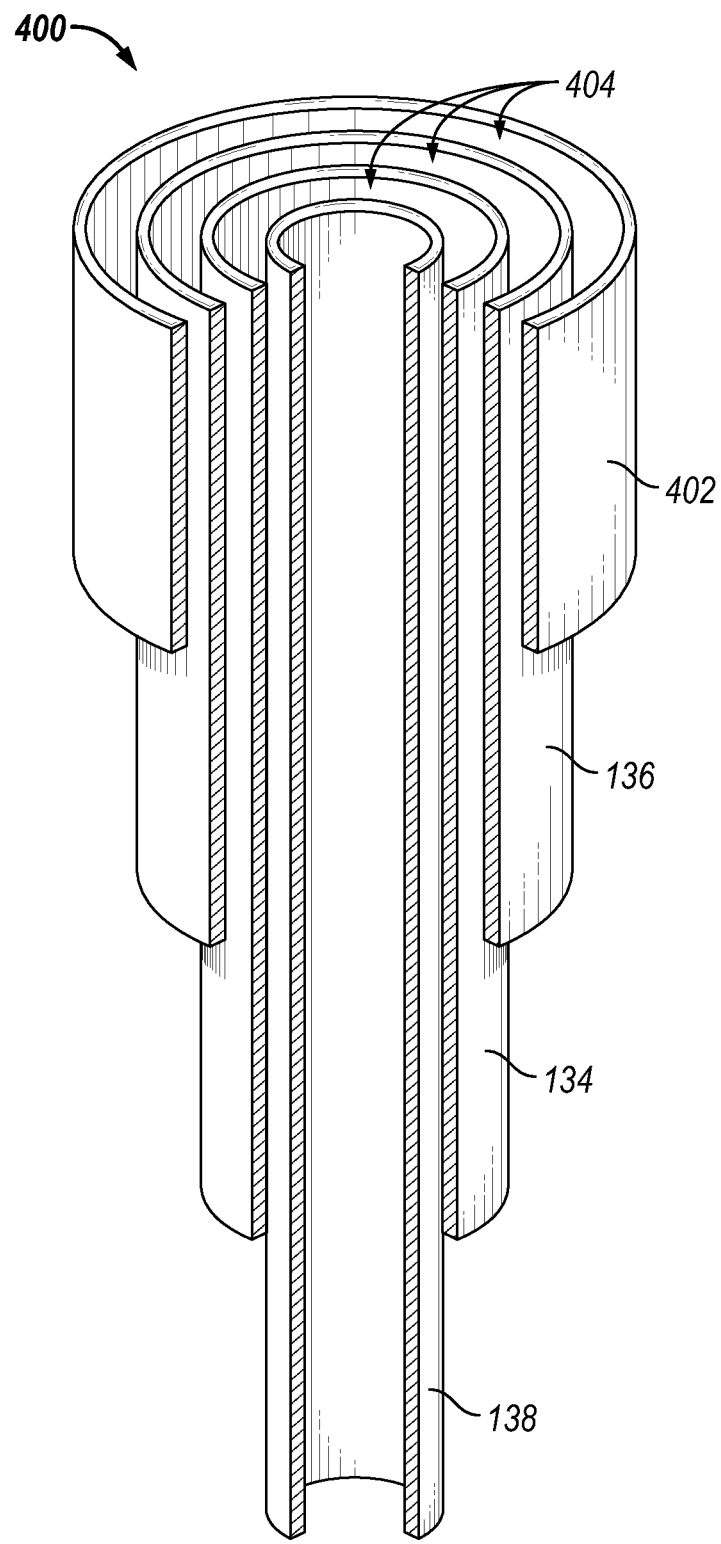
FIG. 4 illustrates an example of a well plan.

FIG. 4 illustrates an example of a well plan 400 in accordance with some embodiments. Depending on the design of well plan 400, well construction may have between two and four main components. These components include conductor, surface, intermediate and production casings. After completion of the well, a tubing may be inserted to pump hydrocarbon products. In this example, well plan 400 may comprise pipe string 138, first casing 134, second casing 136, a conductor casing 402, and wherein cement may be disposed in annulus 404 between each casing. However, it should be noted that well plan 400 may include any number of pipes, casings, tubulars, and/or the like. Well plan 400 is not limited or bound by the four pipes that are displayed in FIG. 4. When EM logging tool 100 is used to monitor the pipe condition a log may be produced.

Monitoring the condition of the casing strings is crucial in oil and gas field operations. As discussed above, EM techniques may be used to inspect pipes, casings, tubulars, and/or the like. Measurements taken by EM logging tool 100 may further be processed by information handling system 144 (e.g., referring to FIG. 1).

Figure 5:
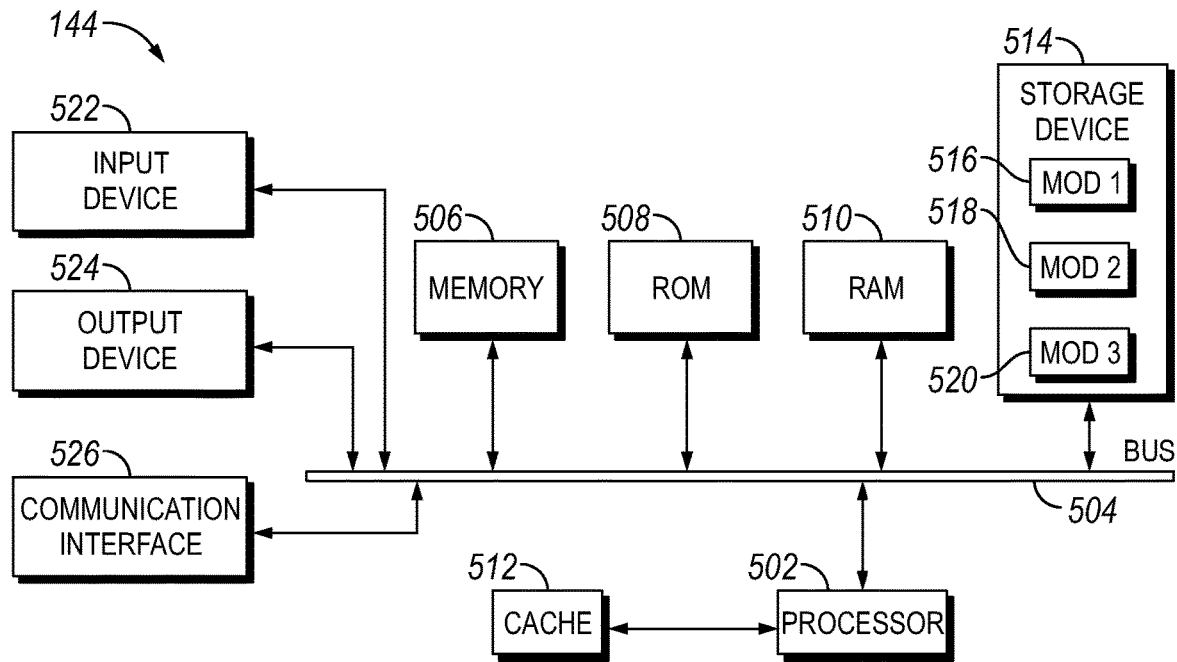
FIG. 5 illustrates a schematic of an information handling system.

FIG. 5 further illustrates an example information handling system 144 which may be employed to perform various steps, methods, and techniques disclosed herein. Persons of ordinary skill in the art will readily appreciate that other system examples are possible. As illustrated, information handling system 144 includes a processing unit (CPU or processor) 502 and a system bus 504 that couples various system components including system memory 506 such as read only memory (ROM) 508 and random-access memory (RAM) 510 to processor 502. Processors disclosed herein may all be forms of this processor 502. Information handling system 144 may include a cache 512 of high-speed memory connected directly with, in close proximity to, or integrated as part of processor 502. Information handling system 144 copies data from memory 506 and/or storage device 514 to cache 512 for quick access by processor 502. In this way, cache 512 provides a performance boost that avoids processor 502 delays while waiting for data. These and other modules may control or be configured to control processor 502 to perform various operations or actions. Other system memory 506 may be available for use as well. Memory 506 may include multiple different types of memory with different performance characteristics. It may be appreciated that the disclosure may operate on information handling system 144 with more than one processor 502 or on a group or cluster of computing devices networked together to provide greater processing capability. Processor 502 may include any general-purpose processor and a hardware module or software module, such as first module 516, second module 518, and third module 520 stored in storage device 514, configured to control processor 502 as well as a special-purpose processor where software instructions are incorporated into processor 502. Processor 502 may be a self-contained computing system, containing multiple cores or processors, a bus, memory controller, cache, etc. A multi-core processor may be symmetric or asymmetric. Processor 502 may include multiple processors, such as a system having multiple, physically separate processors in different sockets, or a system having multiple processor cores on a single physical chip. Similarly, processor 502 may include multiple distributed processors located in multiple separate computing devices but working together such as via a communications network. Multiple processors or processor cores may share resources such as memory 506 or cache 512 or may operate using independent resources. Processor 502 may include one or more state machines, an application specific integrated circuit (ASIC), or a programmable gate array (PGA) including a field PGA (FPGA).

Each individual component discussed above may be coupled to system bus 504, which may connect each and every individual component to each other. System bus 504 may be any of several types of bus structures including a memory bus or memory controller, a peripheral bus, and a local bus using any of a variety of bus architectures. A basic input/output (BIOS) stored in ROM 508 or the like, may provide the basic routine that helps to transfer information between elements within information handling system 144, such as during start-up. Information handling system 144 further includes storage devices 514 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 514 may include software modules 516, 518, and 520 for controlling processor 502. Information handling system 144 may include other hardware or software modules. Storage device 514 is connected to the system bus 504 by a drive interface. The drives and the associated computer-readable storage devices provide nonvolatile storage of computer-readable instructions, data structures, program modules and other data for information handling system 144. In one aspect, a hardware module that performs a particular function includes the software component stored in a tangible computer-readable storage device in connection with the necessary hardware components, such as processor 502, system bus 504, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 144 is a small, handheld computing device, a desktop computer, or a computer server. When processor 502 executes instructions to perform "operations", processor 502 may perform the operations directly and/or facilitate, direct, or cooperate with another device or component to perform the operations.

As illustrated, information handling system 144 employs storage device 514, which may be a hard disk or other types of computer-readable storage devices which may store data that are accessible by a computer, such as magnetic cassettes, flash memory cards, digital versatile disks (DVDs), cartridges, random access memories (RAMs) 210, read only memory (ROM) 508, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 144, an input device 522 represents any number of input mechanisms, such as a microphone for speech, a touch-sensitive screen for gesture or graphical input, keyboard, mouse, motion input, speech and so forth. Additionally, input device 522 may receive one or more EM measurements from EM logging tool 100 (e.g., referring to FIG. 1), discussed above. An output device 524 may also be one or more of a number of output mechanisms known to those of skill in the art. In some instances, multimodal systems enable a user to provide multiple types of input to communicate with information handling system 144. Communications interface 526 generally governs and manages the user input and system output. There is no restriction on operating on any particular hardware arrangement and therefore the basic hardware depicted may easily be substituted for improved hardware or firmware arrangements as they are developed.

As illustrated, each individual component describe above is depicted and disclosed as individual functional blocks. The functions these blocks represent may be provided through the use of either shared or dedicated hardware, including, but not limited to, hardware capable of executing software and hardware, such as a processor 502, that is purpose-built to operate as an equivalent to software executing on a general purpose processor. For example, the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 508 for storing software performing the operations described below, and random-access memory (RAM) 510 for storing results. Very large-scale integration (VLSI) hardware embodiments, as well as custom VLSI circuitry in combination with a general-purpose DSP circuit, may also be provided.

Figure 6:
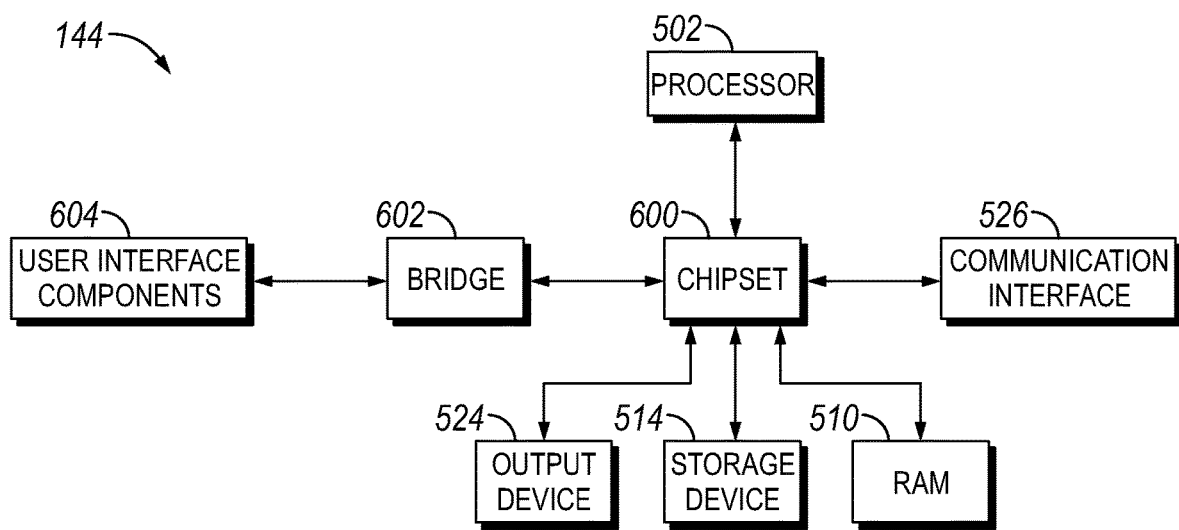
FIG. 6 illustrates a schematic of a chip set.

FIG. 6 illustrates an example information handling system 144 having a chipset architecture that may be used in executing the described method and generating and displaying a graphical user interface (GUI). Information handling system 144 is an example of computer hardware, software, and firmware that may be used to implement the disclosed technology. Information handling system 144 may include a processor 502, representative of any number of physically and/or logically distinct resources capable of executing software, firmware, and hardware configured to perform identified computations. Processor 502 may communicate with a chipset 600 that may control input to and output from processor 502. In this example, chipset 600 outputs information to output device 524, such as a display, and may read and write information to storage device 514, which may include, for example, magnetic media, and solid-state media.

Chipset 600 may also read data from and write data to RAM 510. A bridge 602 for interfacing with a variety of user interface components 604 may be provided for interfacing with chipset 600. Such user interface components 604 may include a keyboard, a microphone, touch detection and processing circuitry, a pointing device, such as a mouse, and so on. In general, inputs to information handling system 144 may come from any of a variety of sources, machine generated and/or human generated.

Chipset 600 may also interface with one or more communication interfaces 526 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 502 analyzing data stored in storage device 514 or RAM 510. Further, information handling system 144 receive inputs from a user via user interface components 604 and execute appropriate functions, such as browsing functions by interpreting these inputs using processor 502.

In examples, information handling system 144 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

Figure 7:
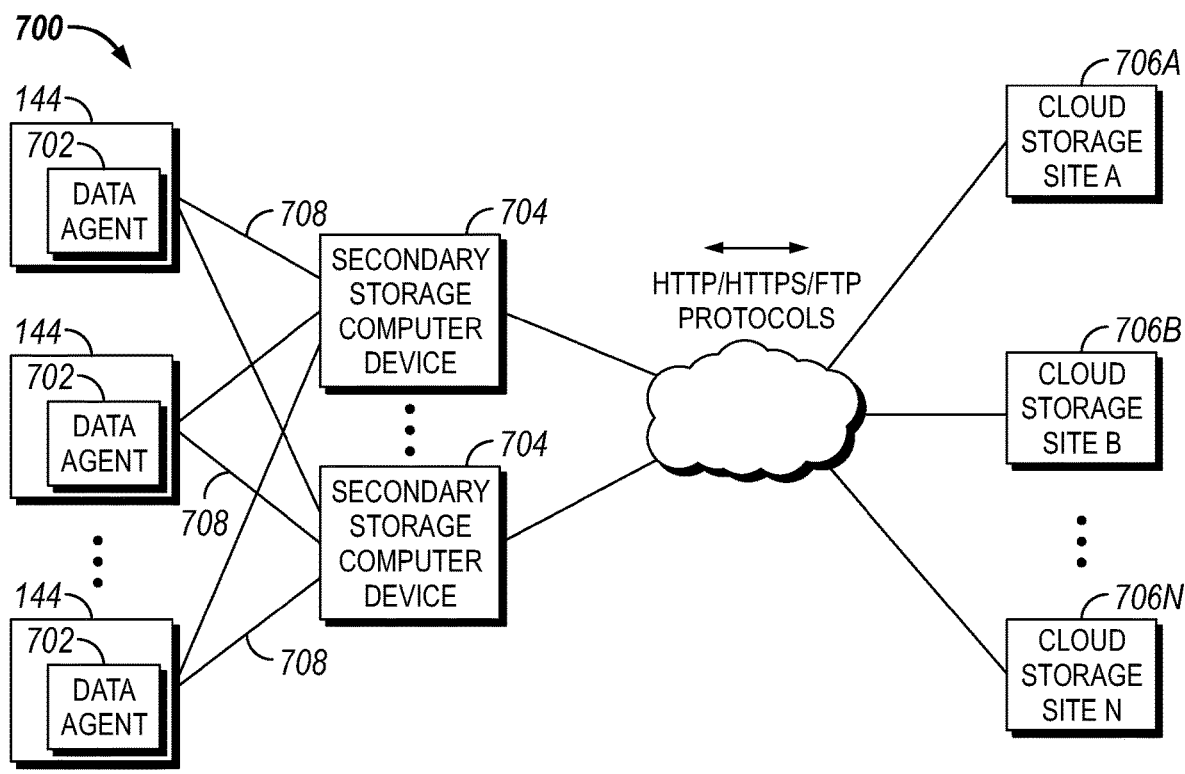
FIG. 7 illustrates a computing network.

FIG. 7 illustrates an example of one arrangement of resources in a computing network 700 that may employ the processes and techniques described herein, although many others are of course possible. As noted above, an information handling system 144, as part of their function, may utilize data, which includes files, directories, metadata (e.g., access control list (ACLS) creation/edit dates associated with the data, etc.), and other data objects. The data on the information handling system 144 is typically a primary copy (e.g., a production copy). During a copy, backup, archive or other storage operation, information handling system 144 may send a copy of some data objects (or some components thereof) to a secondary storage computing device 704 by utilizing one or more data agents 702.

A data agent 702 may be a desktop application, website application, or any software-based application that is run on information handling system 144. As illustrated, information handling system 144 may be disposed at any rig site (e.g., referring to FIG. 1), off site location, or repair and manufacturing center. The data agent may communicate with a secondary storage computing device 704 using communication protocol 708 in a wired or wireless system. Communication protocol 708 may function and operate as an input to a website application. In the website application, field data related to pre- and post-operations, generated DTCs, notes, and the like may be uploaded. Additionally, information handling system 144 may utilize communication protocol 708 to access processed measurements, operations with similar DTCs, troubleshooting findings, historical run data, and/or the like. This information is accessed from secondary storage computing device 704 by data agent 702, which is loaded on information handling system 144.

Secondary storage computing device 704 may operate and function to create secondary copies of primary data objects (or some components thereof) in various cloud storage sites 706A-N. Additionally, secondary storage computing device 704 may run determinative algorithms on data uploaded from one or more information handling systems 144, discussed further below. Communications between the secondary storage computing devices 704 and cloud storage sites 706A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 706A-N, the secondary storage computing device 704 may also perform local content indexing and/or local object-level, sub-object-level or block-level deduplication when performing storage operations involving various cloud storage sites 706A-N. Cloud storage sites 706A-N may further record and maintain, EM logs, map DTC codes, store repair and maintenance data, store operational data, and/or provide outputs from determinative algorithms that are located in cloud storage sites 706A-N. In a non-limiting example, this type of network may be utilized as a platform to store, backup, analyze, import, preform extract, transform and load ("ETL") processes, mathematically process, apply machine learning models, and augment EM measurement data sets.

A machine learning model may be an empirically derived model which may result from a machine learning algorithm identifying one or more underlying relationships within a dataset. In comparison to a physics-based model, such as Maxwell's Equations, which are derived from first principals and define the mathematical relationship of a system, a pure machine learning model may not be derived from first principals. Once a machine learning model is developed, it may be queried in order to predict one or more outcomes for a given set of inputs. The type of input data used to query the model to create the prediction may correlate both in category and type to the dataset from which the model was developed.

The structure of, and the data contained within a dataset provided to a machine learning algorithm may vary depending on the intended function of the resulting machine learning model. The rows of data, or data points, within a dataset may contain one or more independent values. Additionally, datasets may contain corresponding dependent values. The independent values of a dataset may be referred to as "features," and a collection of features may be referred to as a "feature space." If dependent values are available in a dataset, they may be referred to as outcomes or "target values." Although dependent values may be a necessary component of a dataset for certain algorithms, not all algorithms require a dataset with dependent values. Furthermore, both the independent and dependent values of the dataset may comprise either numerical or categorical values.

While it may be true that machine learning model development is more successful with a larger dataset, it may also be the case that the whole dataset isn't used to train the model. A test dataset may be a portion of the original dataset which is not presented to the algorithm for model training purposes. Instead, the test dataset may be used for what may be known as "model validation," which may be a mathematical evaluation of how successfully a machine learning algorithm has learned and incorporated the underlying relationships within the original dataset into a machine learning model. This may include evaluating model performance according to whether the model is over-fit or under-fit. As it may be assumed that all datasets contain some level of error, it may be important to evaluate and optimize the model performance and associated model fit by means of model validation. In general, the variability in model fit (e.g.: whether a model is over-fit or under-fit) may be described by the "bias-variance trade-off." As an example, a model with high bias may be an under-fit model, where the developed model is over-simplified, and has either not fully learned the relationships within the dataset or has over-generalized the underlying relationships. A model with high variance may be an over-fit model which has overlearned about non-generalizable relationships within training dataset which may not be present in the test dataset. In a non-limiting example, these non-generalizable relationships may be driven by factors such as intrinsic error, data heterogeneity, and the presence of outliers within the dataset. The selected ratio of training data to test data may vary based on multiple factors, including, in a non-limiting example, the homogeneity of the dataset, the size of the dataset, the type of algorithm used, and the objective of the model. The ratio of training data to test data may also be determined by the validation method used, wherein some non-limiting examples of validation methods include k-fold cross-validation, stratified k-fold cross-validation, bootstrapping, leave-one-out cross-validation, resubstitution, random sub-sampling, and percentage hold-out.

In addition to the parameters that exist within the dataset, such as the independent and dependent variables, machine learning algorithms may also utilize parameters referred to as "hyperparameters." Each algorithm may have an intrinsic set of hyperparameters which guide what and how an algorithm learns about the training dataset by providing limitations or operational boundaries to the underlying mathematical workflows on which the algorithm functions. Furthermore, hyperparameters may be classified as either model hyperparameters or algorithm parameters.

Model hyperparameters may guide the level of nuance with which an algorithm learns about a training dataset, and as such model hyperparameters may also impact the performance or accuracy of the model that is ultimately generated. Modifying or tuning the model hyperparameters of an algorithm may result in the generation of substantially different models for a given training dataset. In some cases, the model hyperparameters selected for the algorithm may result in the development of an over-fit or under-fit model. As such, the level to which an algorithm may learn the underlying relationships within a dataset, including the intrinsic error, may be controlled to an extent by tuning the model hyperparameters.

Model hyperparameter selection may be optimized by identifying a set of hyperparameters which minimize a predefined loss function. An example of a loss function for a supervised regression algorithm may include the model error, wherein the optimal set of hyperparameters correlates to a model which produces the lowest difference between the predictions developed by the produced model and the dependent values in the dataset. In addition to model hyperparameters, algorithm hyperparameters may also control the learning process of an algorithm, however algorithm hyperparameters may not influence the model performance. Algorithm hyperparameters may be used to control the speed and quality of the machine learning process. As such, algorithm hyperparameters may affect the computational intensity associated with developing a model from a specific dataset.

Machine learning algorithms, which may be capable of capturing the underlying relationships within a dataset, may be broken into different categories. One such category may include whether the machine learning algorithm functions using supervised, unsupervised, semi-supervised, or reinforcement learning. The objective of a supervised learning algorithm may be to determine one or more dependent variables based on their relationship to one or more independent variables. Supervised learning algorithms are named as such because the dataset includes both independent and corresponding dependent values where the dependent value may be thought of as "the answer," that the model is seeking to predict from the underlying relationships in the dataset. As such, the objective of a model developed from a supervised learning algorithm may be to predict the outcome of one or more scenarios which do not yet have a known outcome. Supervised learning algorithms may be further divided according to their function as classification and regression algorithms. When the dependent variable is a label or a categorical value, the algorithm may be referred to as a classification algorithm. When the dependent variable is a continuous numerical value, the algorithm may be a regression algorithm. In a non-limiting example, algorithms utilized for supervised learning may include Neural Networks, K-Nearest Neighbors, Naïve Bayes, Decision Trees, Classification Trees, Regression Trees, Random Forests, Linear Regression, Support Vector Machines (SVM), Gradient Boosting Regression, and Perception Back-Propagation.

The objective of unsupervised machine learning may be to identify similarities and/or differences between the data points within the dataset which may allow the dataset to be divided into groups or clusters without the benefit of knowing which group or cluster the data may belong to. Datasets utilized in unsupervised learning may not include a dependent variable as the intended function of this type of algorithm is to identify one or more groupings or clusters within a dataset. In a non-limiting example, algorithms which may be utilized for unsupervised machine learning may include K-means clustering, K-means classification, Fuzzy C-Means, Gaussian Mixture, Hidden Markov Model, Neural Networks, and Hierarchical algorithms.

Figure 8:
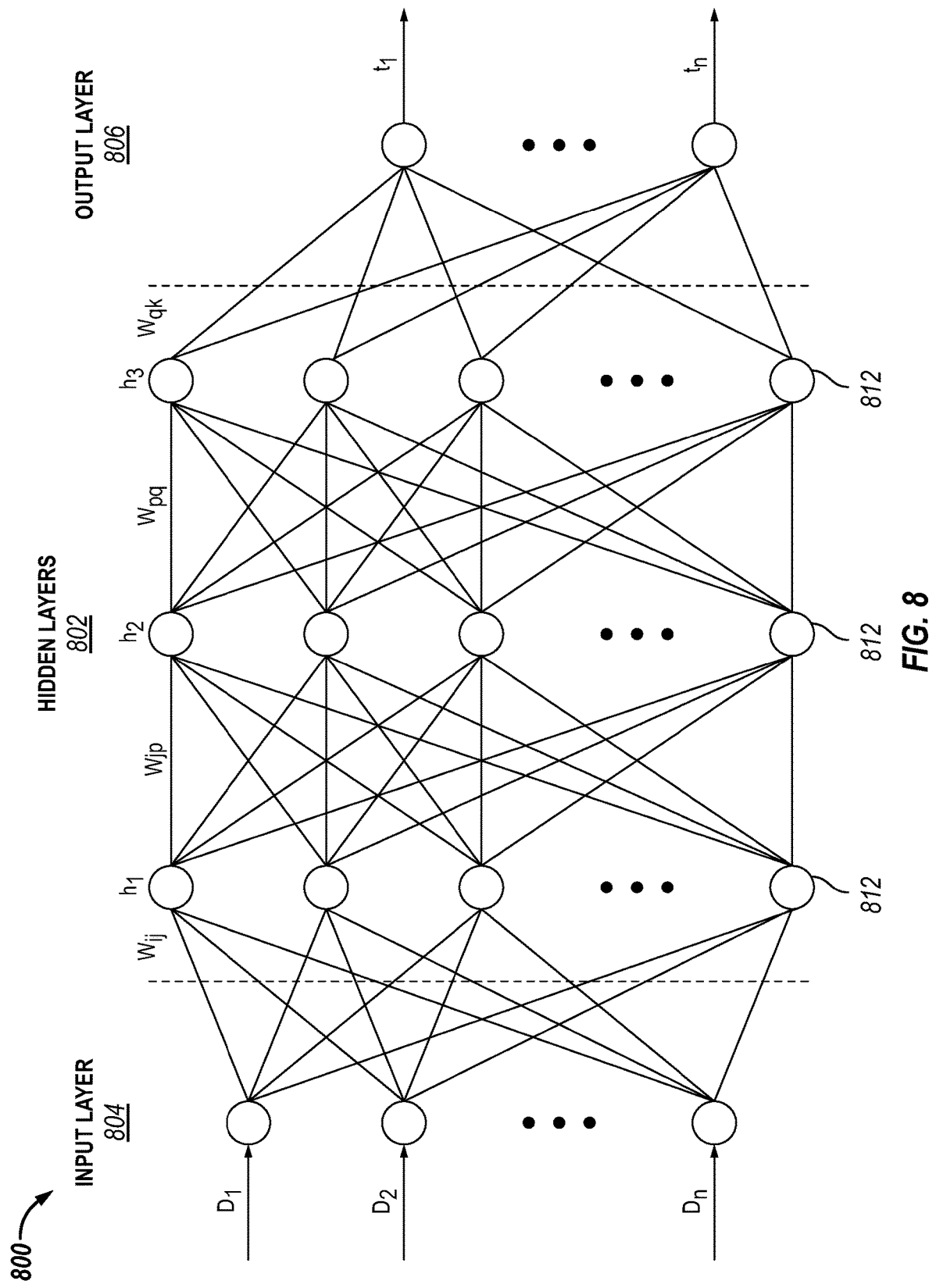
FIG. 8 illustrates a neural network.

In examples to determine a relationship using machine learning, a neural network (NN) 800, as illustrated in FIG. 8, may be utilized to locate collars on one or more pipe strings and/or casings in a well plan 400 (e.g., referring to FIG. 4). A NN 800 is an artificial neural network with one or more hidden layers 802 between input layer 804 and output layer 806. As illustrated, input layer 804 may include all extracted electromagnetic responses from EM logging tool 100 (e.g., referring to FIG. 1), and output layers 806 may include pipe information from other sources. During operations, input data is taken by neurons 812 in first layer which then provide an output to the neurons 812 within next layer and so on which provides a final output in output layer 806. Each layer may have one or more neurons 812. The connection between two neurons 812 of successive layers may have an associated weight. The weight defines the influence of the input to the output for the next neuron 812 and eventually for the overall final output. The training process of NN 800 is to locate collars on one or more pipe strings and/or casings in a well plan 400.

Figure 9:
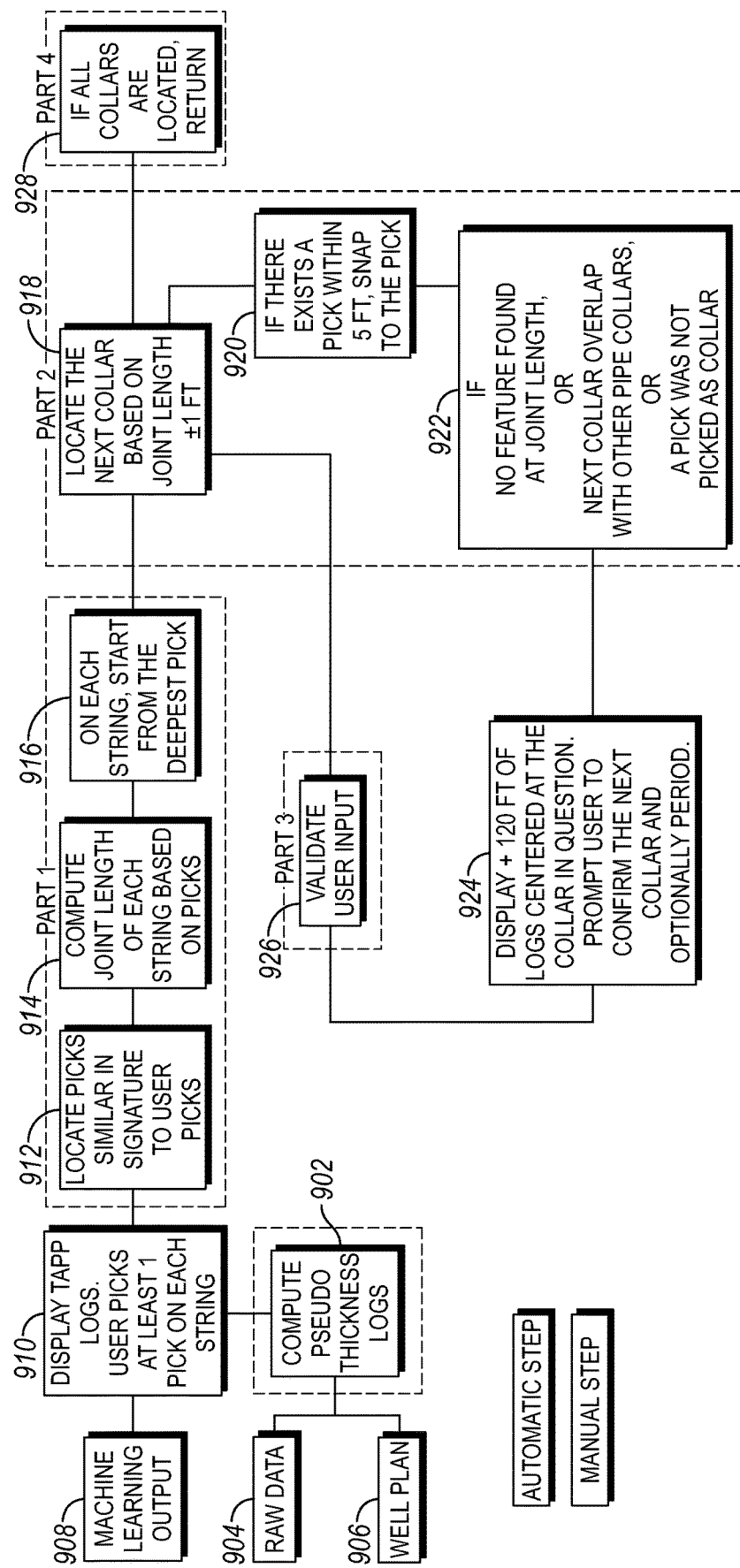
FIG. 9 is a workflow for locating a collar in the well plan.

FIG. 9 is a workflow 900 for locating a collar on a pipe string and one or more casing in a well plan (e.g., referring to FIG. 4). Locating the collar and/or collars may be done automatically, iteratively, and/or with machine assistance. As illustrates, measurements from EM logging tool 100 (e.g., referring to FIG. 1) are fed to a machine learning algorithm, such as NN 800 (e.g., referring to FIG. 8) along with the well plan 400 to be process by information handling system 144 (e.g., referring to FIG. 1) to identify one or more collars.

Workflow 900 may begin with block 902. Block 902 generates pseudo thickness log data from the raw data measurements, where the locations of the collars may be more prominent. The location of the collar may be identified by a collar signature, which may also be referred to as a representative signature, within the pseudo thickness log data, which is identified in the raw signal taken by EM logging tool 100 (e.g., referring to FIG. 1). A representative signature is defined as a change in a measured response caused by a collar in view of a baseline response. The baseline response is defined as a measured response that correlates to the nominal thickness of the tubing (i.e., casing or pipe string) being investigated by EM logging tool 100. As is discussed below, a representative signature may help identify location of other collars based at least in part on a correlation, a cosine distance, or a mean square difference. A pseudo-thickness log is derived from inputs that comprise one or more of the raw measurement curves in block 904 based on another input of well plan 400 in block 906. The raw measurements from block 902 may be found based on transmitter-receiver spacing on EM logging tool 100. For example, the pseudo-thickness of the innermost pipe is derived from the shortest-spacing receiver and the pseudo-thickness of the outermost pipe is derived from the longest-spacing receiver. The pseudo-thickness log is displayed in block 908 to personnel. In block 910, personnel may identify the location of at least one collar on each pipe as an output in block 908. The location of a collar may be identified by a collar signal, seen in the pseudo-thickness log. These locations are referred to as "picks" and are used as reference to find additional collar locations.

In block 912, other collar signatures are identified that are similar to the collar signature chosen by personnel in block 910. During this operation, the reference collar locations on the pseudo-thickness logs may be used to identify similar patterns, in collar signatures, which have more than a threshold of 95% similarity with the user input collar location (i.e., collar signature). In block 914, joint length for pipe string 138 and one or more casings 134, 136, and/or 402 (e.g., referring to FIG. 4) may be found utilizing the identified locations (i.e., identified collar signatures) of collars. Based on the distance between the picks, the joint length for each pipe is determined. After locating collars in blocks 912 and 914, on each string (e.g., pipe string 138 and one or more casings 134, 136, and/or 402) identifying collars is initiated from the deepest collar location on each string.

In block 918, from each previous casing collar locations, any similar pattern (i.e., similar collar signature) within +/−1 ft distance from joint length may be selected as a candidate for the next collar on pipe string 138 and one or more casings 134, 136, and/or 402. In block 920, if the pseudo-thickness log shows similarity in the collar signature pattern within five feet (0.3 meters), the location may be identified as the next collar location. In block 922, if there is no significant feature at the desired location, or this location overlaps with collar locations on other pipe strings (i.e., the casing collar signatures overlap), or if a pick is not selected as the collar location, the algorithm pauses and let the user decide on the location in block 924. In block 924, the pseudo-thickness log for +/−120 ft. (40 meters) from the last casing collar location, identified by a collar signature, is displayed to the user to locate the casing collar signature for pipe string 138 and one or more casings 134, 136, and/or 402. Although not illustrated, in examples the collar signature identified above may be subtracted from the pseudo-thickness log to render a second pseudo-thickness logs with one or more suppressed artifacts. In this example, artifacts are defined as collars. In block 926, the user selection is validated to check if all the desired characteristics for a casing collar locations are satisfied or not (i.e., the number of user-selected collar signatures matches the number of suggested collar signatures prompted by the algorithm). If all the properties are satisfied the user location is chosen as the location of the next casing collar. If not satisfied, the user is again prompted to select the location of the next casing collar. In block 928, when the algorithm completes the search for casing collar signatures to identify casing collar locations at all depths, the algorithm returns.

Figure 10A:
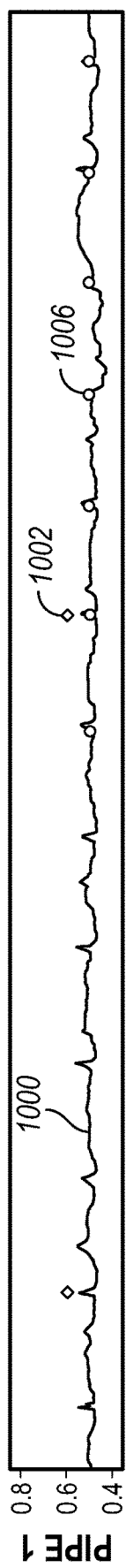
FIGS. 10A-10C are graphs illustrating the results of the workflow in FIG. 9.
Figure 10B:
Figure 10C:
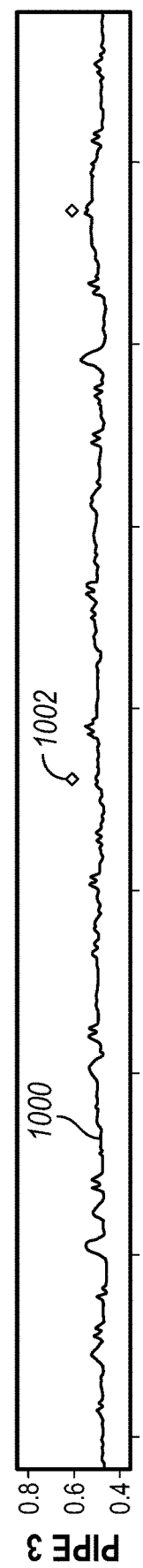

FIGS. 10A-10C are graphs utilizing workflow 900 in FIG. 9 to locate collars on a first pipe, second pipe, and third pipe, respectfully. Solid lines 1000 are the pseudo thickness curves. Diamond markers 1002 are the suggested collars signatures based on pattern similarity with the user picks. In examples, the users pick may be referred to as a representative signature. Star markers 1004 are the suggested collars signatures based on periodicity from the last confirmed collar signature. Circle markers 1006 are confirmed collar signatures from the consensus of both pattern similarity and periodicity, or those confirmed by a user.

Figure 11:
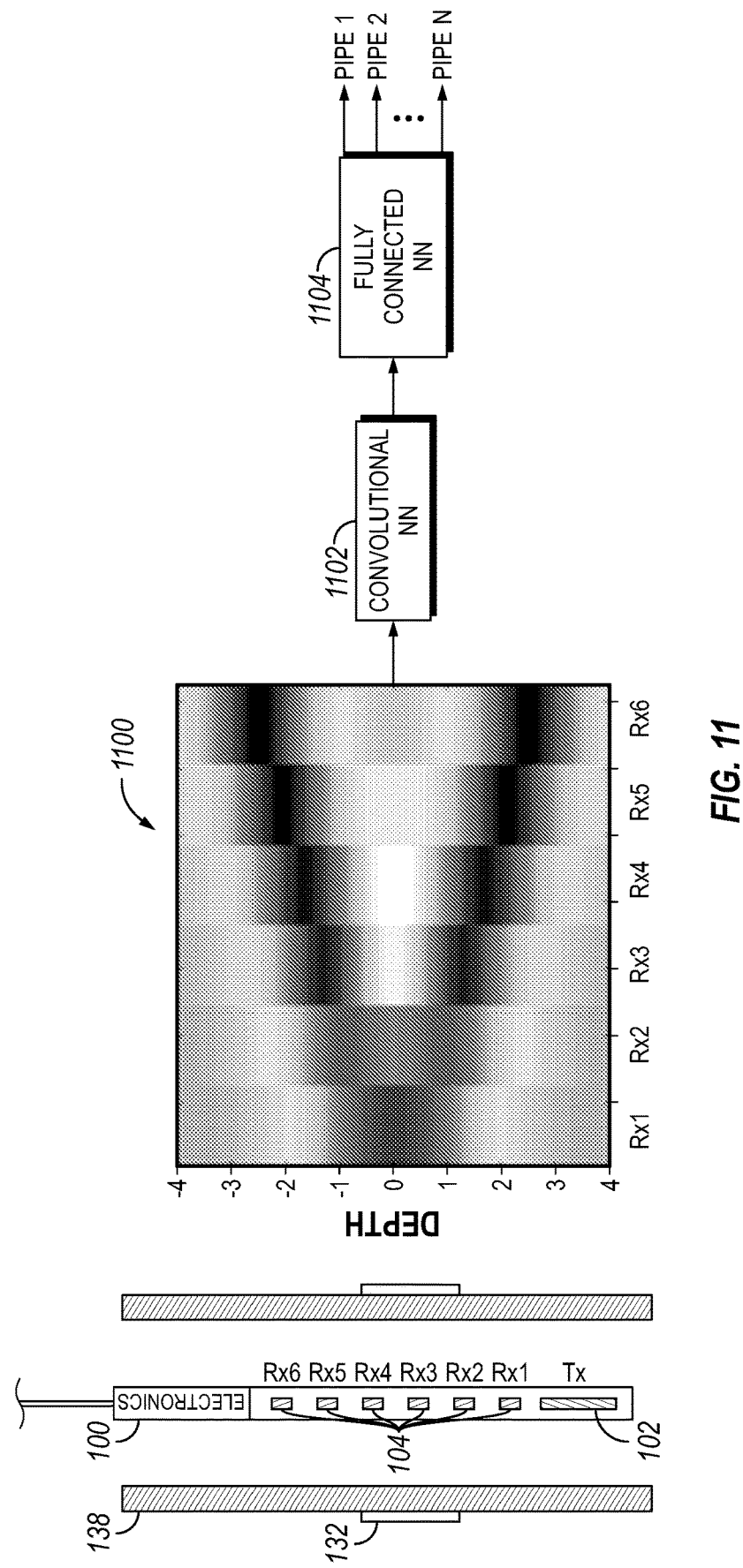
FIG. 11 is a workflow for using a variable density log to find a collar.

In other examples, workflow 900 may be augmented with machine learning predictions from a multi-class classifier. In one embodiment, a multi-class neural network may be trained to generate predictions in the form of likelihood curves that give the probability of a feature in the raw data being a collar signature, and thus a collar location, on a given pipe. NN 800 may be a deep neural network with a convolutional neural network that operates on crops of raw data image, in the form of variable density logs, followed by a fully-connected neural network to output the probability of the different classes. FIG. 11 illustrates the methods described above. For example, EM logging tool 100 includes a transmitter 102 and a plurality of receiver 104. EM logging tool 100 is disposed in pipe string 138 with a collar 132. Graph 1100 illustrates a variable density log for measurements taken by each receiver 104 of collar 132. The measurements may be inputs for a convolutional NN 1102. Outputs from convolutional NN 1102 may be utilized as inputs for a fully-connected NN 1104 that may output the probability of a collar signature, which is a location of a collar, at a given pipe. A given collar signature on the raw data may be assigned to the pipe with maximum likelihood. This assignment may be used to automate the step of locating picks in blocks 912-916 for workflow 900 (e.g., referring to FIG. 9). Additionally, the likelihood curves may be displayed to guide user selection of ambiguous collar locations. Ambiguous collar locations may be waveform signatures that may not be identical or nearly identical to collar signatures.

Figure 12A:
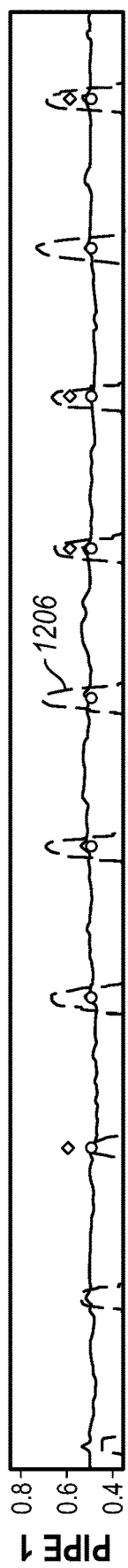
FIGS. 12A-12C are graphs illustrating the results of using the variable density log.
Figure 12B:
Figure 12C:
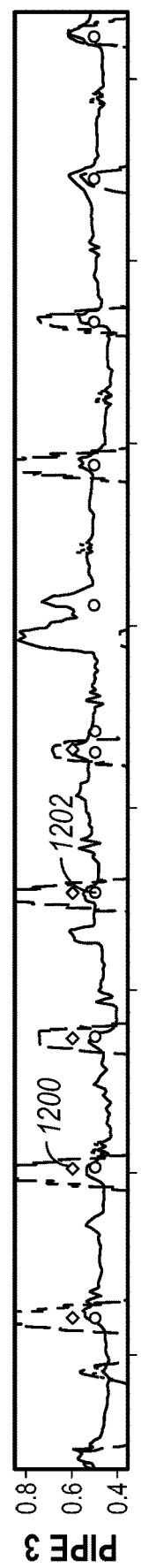

FIGS. 12A-12C are graph utilizing the methods above in FIG. 11 to locate collars on a first pipe, second pipe, and third pipe, respectfully. Solid lines 1200 are the pseudo thickness curves. Diamond markers 1202 are the suggested collar signatures based on pattern similarity (i.e., similar or identical signatures) with the user picks. In examples, the user picks may be referred to as representative signatures. Star markers 1204 are the suggested collar signatures based on periodicity from the last confirmed collar signature. Circle markers 1206 are the confirmed collar signatures from the consensus of both pattern similarity of the waveform signature and periodicity of the waveform signature, or those waveform signatures confirmed by a user to be collar signatures. Solid lines 1208 illustrate likelihood curves identified by the methods in system in FIG. 11 to identify signatures, which are collars 132 (e.g., referring to FIG. 1).

Improvements from the methods and systems described above comprise enabling personnel to identify the distinct features corresponding to locations of collars on well-casings (user-selected picks) and using an algorithm that locates similar picks based on signature similarity, automatically estimates pipe joint length, and locates other collars in between these picks based on the estimated joint length. Machine-learning likelihood curves can be used to make automatic decisions or guide user's decision on ambiguous collar locations. This may enable users to assist the algorithm on the location of collars on well-casings when the algorithm finds ambiguous inputs to decide.

This method and system for determining a location of a collar on a pipe string or casing may include any of the various features of the compositions, methods, and system disclosed herein, including one or more of the following statements.

Statement 1: A method may comprise disposing an electromagnetic (EM) logging tool in a wellbore. The EM logging tool may comprise a transmitter disposed on the EM logging tool and a receiver disposed on the EM logging tool. The method may further comprise transmitting an electromagnetic field from the transmitter into one or more tubulars to energize the one or more tubulars with the electromagnetic field thereby producing an eddy current that emanates from the one or more tubulars, measuring the eddy current in the one or more tubulars with the receiver on at least one channel to obtain a plurality of measurements, forming an EM log from the plurality of measurements, identifying a representative signature of a collar from the EM log, locating a plurality of signatures that are similar to the representative signature, iteratively locating a collar signature based at least in part on the representative signature, the plurality of signatures that are similar to the representative signature, and a joint length, and displaying a depth for each of the one or more collars.

Statement 2. The method of statement 1, further comprising locating the one or more collars with a machine learning model when the collar signature is not identified at one or both ends of the joint length.

Statement 3. The method of any preceding statement, further comprising locating the one or more collars with a machine learning model when a collar location overlaps with a second collar on another tubular.

Statement 4. The method of any preceding statement, further comprising locating the one or more collars with a machine learning model when one of the plurality of signatures that are similar to the representative signature is not the one or more collars.

Statement 5. The method of any preceding statement, further comprising selecting the one or more collars with personnel using in part an output from the machine learning model.

Statement 6. The method of any preceding statement, wherein the machine learning model is trained to resolve when the collar signature is not identified at one or both ends of the joint length, when a collar location overlaps with a second collar on another pipe, or when one of the plurality of signatures that are similar to the representative signature is not the one or more collars.

Statement 7. The method of any preceding statement, wherein identifying the representative signature from the EM log is performed manually by personnel.

Statement 8. The method of statement 7, wherein a machine learning model assists the personnel in the identifying the representative signature.

Statement 9. The method of any preceding statement 1-7, further comprising identifying the one or more collars with a machine learning model using a threshold.

Statement 10. The method of statement 9, wherein the machine learning model is a multi-class classification model.

Statement 11. The method of statement 9, wherein the machine learning model is a physics-based model.

Statement 12. The method of any preceding statement 1-7 and 9, locating a plurality of similar signatures that are similar to the representative signature based at least in part on a metric such as a correlation, a cosine distance, or a mean square difference.

Statement 13. The method of any preceding statement 1-7, 9, and 12, wherein the representative signature is defined as a change in a measured response caused by a collar in view of a baseline response.

Statement 14. The method of any preceding statement 1-7, 9, 12, and 13, wherein the joint length is identified based at least in part on the one or more collars or set by personnel.

Statement 15. The method of any preceding statement 1-7, 9, and 12-14, further comprising consolidating the one or more collars that are within five feet (0.3 meter) of each other.

Statement 16. The method of any preceding statement 1-7, 9, and 12-15, wherein the receiver is axially spaced from the transmitter and configured to measure an amplitude response, a phase response, or real and imaginary response at one or more frequencies in a frequency-domain measurement.

Statement 17. The method of any preceding statement 1-7, 9, and 12-16, wherein the receiver and the transmitter are co-located and configured to measure a decay response in a time-domain measurement.

Statement 18. The method of any preceding statement 1-7, 9, and 12-17, wherein the EM log is converted into a pseudo thickness log.

Statement 19. The method of statement 18, wherein the pseudo thickness log is representative of a pipe string or one or more casings.

Statement 20. The method of statement 19, further comprising subtracting the signatures of located collars from the pseudo thickness log to render a second pseudo thickness logs with one or more suppressed artifacts.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   disposing an electromagnetic (EM) logging tool in a wellbore, wherein the EM logging tool comprises:
   a transmitter disposed on the EM logging tool; and
   a receiver disposed on the EM logging tool;
   transmitting an electromagnetic field from the transmitter into one or more tubulars to energize the one or more tubulars with the electromagnetic field thereby producing an eddy current that emanates from the one or more tubulars;
   measuring the eddy current in the one or more tubulars with the receiver on at least one channel to obtain a plurality of measurements;
   forming an EM log from the plurality of measurements;
   identifying a representative signature of one or more collars from the EM log, wherein the EM log is converted into a pseudo thickness log;
   locating a plurality of signatures that are similar to the representative signature;
   iteratively locating a collar signature based at least in part on the representative signature, the plurality of signatures that are similar to the representative signature, and a joint length; and
   displaying a depth for each of the one or more collars.

2. The method of claim 1, further comprising locating the one or more collars with a machine learning model when the collar signature is not identified at one or both ends of the joint length.

3. The method of claim 1, further comprising locating the one or more collars with a machine learning model when a collar location overlaps with a second collar on another tubular.

4. The method of claim 1, further comprising locating the one or more collars with a machine learning model when one of the plurality of signatures that are similar to the representative signature is not the one or more collars.

5. The method of claim 4, further comprising selecting the one or more collars with personnel using in part an output from the machine learning model.

6. The method of claim 4, wherein the machine learning model is trained to resolve when the collar signature is not identified at one or both ends of the joint length, when a collar location overlaps with a second collar on another pipe, or when one of the plurality of signatures that are similar to the representative signature is not the one or more collars.

7. The method of claim 1, wherein identifying the representative signature from the EM log is performed manually by personnel.

8. The method of claim 7, wherein a machine learning model assists the personnel in the identifying the representative signature.

9. The method of claim 1, further comprising identifying the one or more collars with a machine learning model using a threshold.

10. The method of claim 9, wherein the machine learning model is a multi-class classification model.

11. The method of claim 9, wherein the machine learning model is a physics-based model.

12. The method of claim 1, locating a plurality of similar signatures that are similar to the representative signature based at least in part on a metric such as a correlation, a cosine distance, or a mean square difference.

13. The method of claim 1, wherein the representative signature is defined as a change in a measured response caused by a collar in view of a baseline response.

14. The method of claim 1, wherein the joint length is identified based at least in part on the one or more collars or set by personnel.

15. The method of claim 1, further comprising consolidating the one or more collars that are within five feet (0.3 meter) of each other.

16. The method of claim 1, wherein the receiver is axially spaced from the transmitter and configured to measure an amplitude response, a phase response, or real and imaginary response at one or more frequencies in a frequency-domain measurement.

17. The method of claim 1, wherein the receiver and the transmitter are co-located and configured to measure a decay response in a time-domain measurement.

18. The method of claim 1, wherein the pseudo thickness log is representative of a pipe string or one or more casings.

19. The method of claim 18, further comprising subtracting the signatures of located collars from the pseudo thickness log to render a second pseudo thickness logs with one or more suppressed artifacts.

20. A method comprising:
   disposing an electromagnetic (EM) logging tool in a wellbore, wherein the EM logging tool comprises:
   a transmitter disposed on the EM logging tool; and
   a receiver disposed on the EM logging tool;
   transmitting an electromagnetic field from the transmitter into one or more tubulars to energize the one or more tubulars with the electromagnetic field thereby producing an eddy current that emanates from the one or more tubulars;
   measuring the eddy current in the one or more tubulars with the receiver on at least one channel to obtain a plurality of measurements;
   forming an EM log from the plurality of measurements;
   identifying a representative signature of one or more collars from the EM log;
   locating a plurality of signatures that are similar to the representative signature;
   iteratively locating a collar signature based at least in part on the representative signature, the plurality of signatures that are similar to the representative signature, and a joint length;
   locating the one or more collars with a machine learning model when the collar signature is not identified at one or both ends of the joint length; and
   displaying a depth for each of the one or more collars.

21. A method comprising:
   disposing an electromagnetic (EM) logging tool in a wellbore, wherein the EM logging tool comprises:
   a transmitter disposed on the EM logging tool; and
   a receiver disposed on the EM logging tool;
   transmitting an electromagnetic field from the transmitter into one or more tubulars with the electromagnetic field thereby producing an eddy current that emanates from the one or more tubulars;

measuring the eddy current in the one or more tubulars with the receiver on at least one channel to obtain a plurality of measurements;

forming an EM log from the plurality of measurements;

identifying a representative signature of one or more collars from the EM log;

locating a plurality of signatures that are similar to the representative signature;

iteratively locating a collar signature based at least in part on the representative signature, the plurality of signatures that are similar to the representative signature, and a joint length;

locating the one or more collars with a machine learning model when a collar location overlaps with a second collar on another tubular; and displaying a depth for each of the one or more collars.

* * * * *